United States Patent
Dixon

(10) Patent No.: US 9,414,222 B1
(45) Date of Patent: Aug. 9, 2016

(54) PREDICTIVE CACHING DEVICES, SYSTEMS AND METHODS

(71) Applicant: Amazon Technologies, Inc., Reno, NV (US)

(72) Inventor: Scott Allen Dixon, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 201 days.

(21) Appl. No.: 13/796,313

(22) Filed: Mar. 12, 2013

(51) Int. Cl.
*G06F 15/16* (2006.01)
*H04W 8/24* (2009.01)

(52) U.S. Cl.
CPC ...................................... *H04W 8/245* (2013.01)

(58) Field of Classification Search
USPC .......................... 709/219, 224, 225, 232–235
See application file for complete search history.

(56) References Cited

U.S. PATENT DOCUMENTS

| | | | |
|---|---|---|---|
| 7,574,240 B1 * | 8/2009 | Jenkins, IV | 455/574 |
| 8,046,435 B1 * | 10/2011 | Parekh et al. | 709/219 |
| 2002/0069132 A1 * | 6/2002 | Perkes et al. | 705/26 |
| 2005/0055426 A1 * | 3/2005 | Smith et al. | 709/219 |
| 2008/0235360 A1 * | 9/2008 | Li et al. | 709/223 |
| 2010/0318535 A1 * | 12/2010 | Weber | G06F 17/3087 707/759 |
| 2013/0067170 A1 * | 3/2013 | Lam | 711/137 |

OTHER PUBLICATIONS

Windows Phone, "Connecting: how and when," Oct. 2011, Windows Phone, www.windowsphone.com/en-us/how-to/wp7/start/connecting-how-and-when.*

* cited by examiner

*Primary Examiner* — Ruolei Zong
(74) *Attorney, Agent, or Firm* — Seyfarth Shaw LLP; Ilan N. Barzilay; Joseph M. Walker

(57) ABSTRACT

A system and method for predicting potential future data content that a user of a device may potentially access and consume, and pre-downloading the data content prior to a predicted time the user may access and consume the data. Network coverage dead spots can also be identified and the data can be pre-downloaded on the user's device before the user enters the dead spots, thereby providing the user with relevant data even when the user is located in a dead spot. The prediction may be based on the user's past usage of the device, the user's past behavior, and other such data to as to download relevant data to the user's and limit consumption of storage on the user's device.

20 Claims, 14 Drawing Sheets

PREDICTIVE CACHING DEVICES, SYSTEMS AND METHODS

BACKGROUND

With the advancement of technology, the use and popularity of electronic devices, such as smart phones, has increased considerably. Mobile devices, such as smart phones, are designed to connect to various networks to retrieve and transmit data. However, these networks can have gaps in their coverage areas that cause the devices to lose connectivity to such networks.

BRIEF DESCRIPTION OF DRAWINGS

For a more complete understanding of the present disclosure, reference is now made to the following description taken in conjunction with the accompanying drawings.

DETAILED DESCRIPTION

Figure 1:
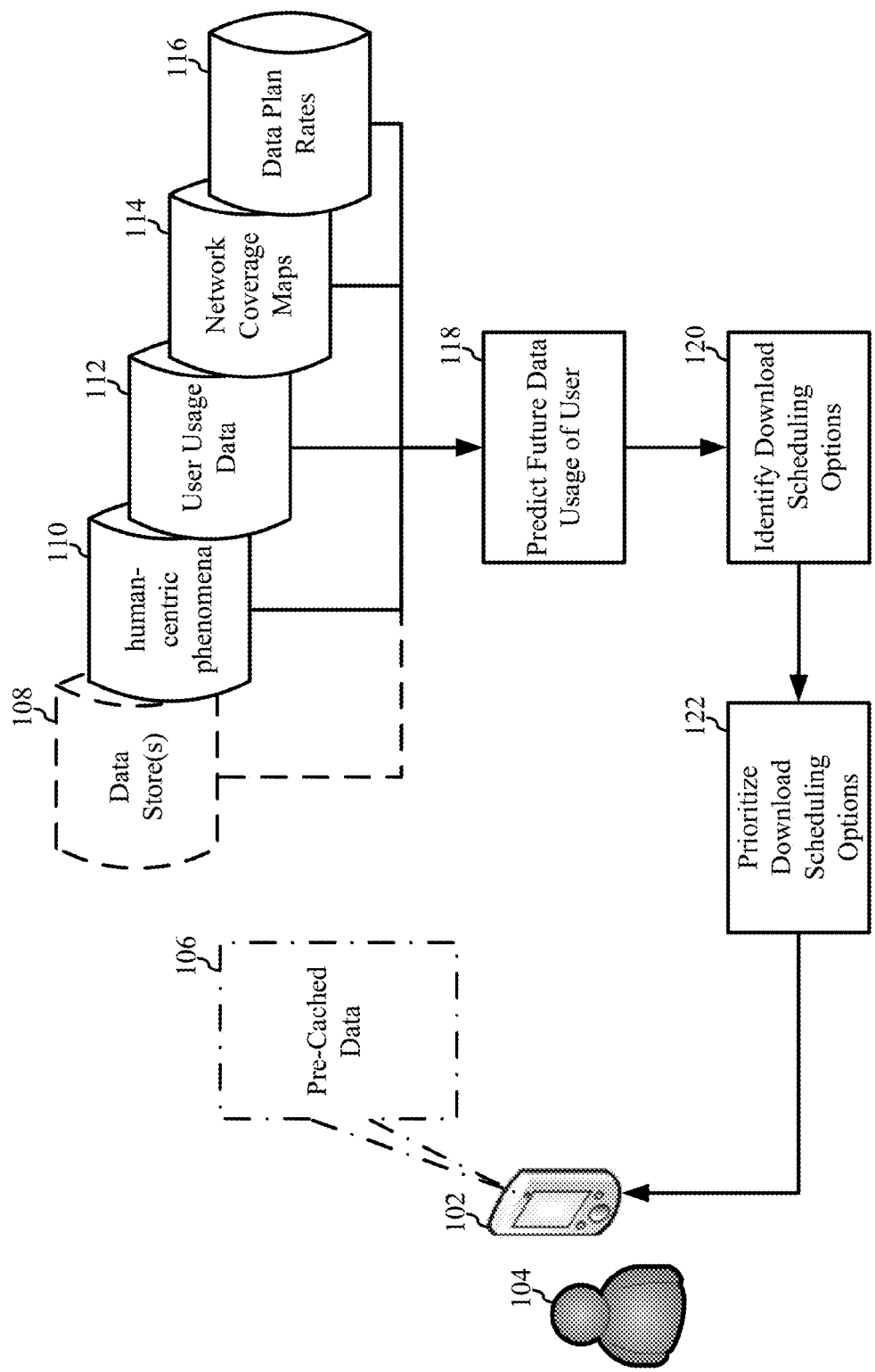
FIG. 1 illustrates a pictorial diagram of a method and system for pre-caching data according to one aspect of the present disclosure.

In one aspect, the present disclosure are directed to methods and systems to predict future data usage and download data on a mobile device prior to when the data will be accessed by a user. As an example, the system may determine that a user will be taking a plane trip in the future, for example, based on the user's calendar information and other data. The system also predicts what type of data the user will likely want to access on the plane, such as a certain movie, television program, book, music, and other content. In this instance, the system can schedule the predicted data/content to be downloaded or cached on the mobile device prior to the user boarding the plane. This allows the user to have access to the predicted data/content without the mobile device accessing a network.

In an aspect, networks, for example, wireless local area networks (WLAN) (such as WiFi), and wireless communication networks such as Long Term Evolution (LTE) networks, WiMAX networks, 3G networks, 4G networks, etc. operate within certain coverage areas. These coverage area can have gaps or dead spots in which no coverage is provided or transmission falls off. These dead spots can be caused by a number of various factors, including electrical interferences, transport protocols, movement of a device out of range of communications equipment, and physical obstructions, for example, hills, mountains, buildings, trees, tunnels, etc.

When a device enters or is within a dead spot, the device may experience connectivity interruptions, such as data transmission or reception interruptions, and other interruptions that affect the operation of the device. Aspects of the present disclosure are directed to methods and systems to predict future data usage and pre-cache data on the device prior to the device entering a dead spot (or other circumstance where data access is difficult or undesirable) and/or prior to the data being accessed by a user of the device. In one aspect, various data sources are used to predict what type of data to pre-cache and when to pre-cache such data. This pre-caching allows the device provide the user with access to data that may not otherwise be available due to interruptions in network connectivity. For example, if historically the user watches an episode of a certain television show around 5:00 PM on the user's train ride home from work and the device experiences an interruption in network connectivity when the train enters a tunnel, the device may pre-cache the next episode of the television show earlier in the day to allow the user to watch the television show at 5:00 PM without interruption.

The data sources used to predict future data access may include wireless data plan rates, usage data of the device and user data, network coverage data, device storage data, device power data, location data, human science, human phenomena, social phenomena, and other data sources. The configuration may be performed on local devices through cooperation of a remote device, which may provide the ability to compile and analyze source data for a variety of users. The predictive and pre-caching techniques described herein may be applied to a variety of computing devices, such as telephone computing devices, laptop computers, personal digital assistants (PDAs), tablet computers, other mobile devices, server-client computing devices, mainframe computing devices, etc.

In one aspect of the present disclosure, sophisticated knowledge of human-centric physical phenomena, human societal norms, a user's usage history, a map of data connection quality or coverage map, data plan rates or cost, availability of network connectivity and/or other information is used to pre-cache data expected to be accessed or consumed in the future and/or schedule pre-caching/download operations to be triggered by network connectivity becoming available at a given location and time. These data may be stored on a local device or on a remote device. If stored on a remote device, the data sources may also be analyzed by the remote device or accessed and analyzed by the local device. When the remote device is analyzing data sources to predict what data to pre-cache, the remote device may transmit pre-caching instructions/data to the local device or the local device may access the remote device for pre-caching/download operations.

FIG. 1 illustrates an exemplary implementation of the system and method. A device 102, for example, a mobile device, of a user 104 is configured to pre-cache data relating to one or more download scheduling options 106. The download scheduling options are determined using predictive data techniques. As illustrated in FIG. 1, there are multiple databases or data stores 108 including various information, including a human-centric phenomena data store 110, a user usage data store 112, a network coverage map data store 114, and a data plan rate data store 116.

The human-centric phenomena data store 110 may include, but is not limited to, schema describing established societal standards for localities, physical phenomena of interest to humans such as the weather, time-of-day, tides, etc. The user usage data store 112 may include, but is not limited to, a user's historic usage pattern, the user's calendar, the user's preferences and interests and the like. The network coverage map data store 114 may include, but is not limited to, real-time network coverage data for various data networks. This coverage data may be collected by a service, using local data from the device and/or crowd-sourced data from multiple devices and used to create an accurate, micro-scale map of areas the user regularly traverses. This crowd-sourced data may be anonymized, uploaded to a cloud service, and periodically recombined back into the local service map forming a crowd-sourced micro-coverage map available for areas a user has not mapped with his/her own device. The data plan rate data store 116 may include, but is not limited to, monetary costs associated with caching data based on current and predicted connectivity conditions.

The information in one or more of these data stores is analyzed to predict future data 118 that may be desired by the user 102, identify one or more download scheduling options 120 for the device 102, and prioritize the download scheduling options 122 in order of potential execution. In one aspect, the future data prediction may include compiling and analyzing information in one or more of these data stores. For example, the human-centric phenomena may be fused with locale specific phenomena and processed through localized ontologies, such as societal norms and other schemas to provide intelligent predictive control of the data download scheduling options and query scheduling routines. In another example, the data plan rate information may be used to determine the most cost effective way to pre-cache data. In this example, if the device is currently connected to the internet via a subscription 4G connection, but historical patterns suggest that an open WiFi router will be available in the future and allow the data to be pulled at a lower cost before the data is needed, the caching option can be scheduled for when the more cost effective WiFi connection is available.

The operations of FIG. 1 may be performed locally on a device being operated by a user, or may be performed in whole or in part on a remote device which is connected to the device being operated by a user. For example, a remote device may store the data used to predict future user data usage. The remote device may also analyze the stored data to predict the future data usage and generate download scheduling options for use by the local device. A more detailed description of a distributed environment using a local device and one or more remote devices is discussed below.

Figure 2:
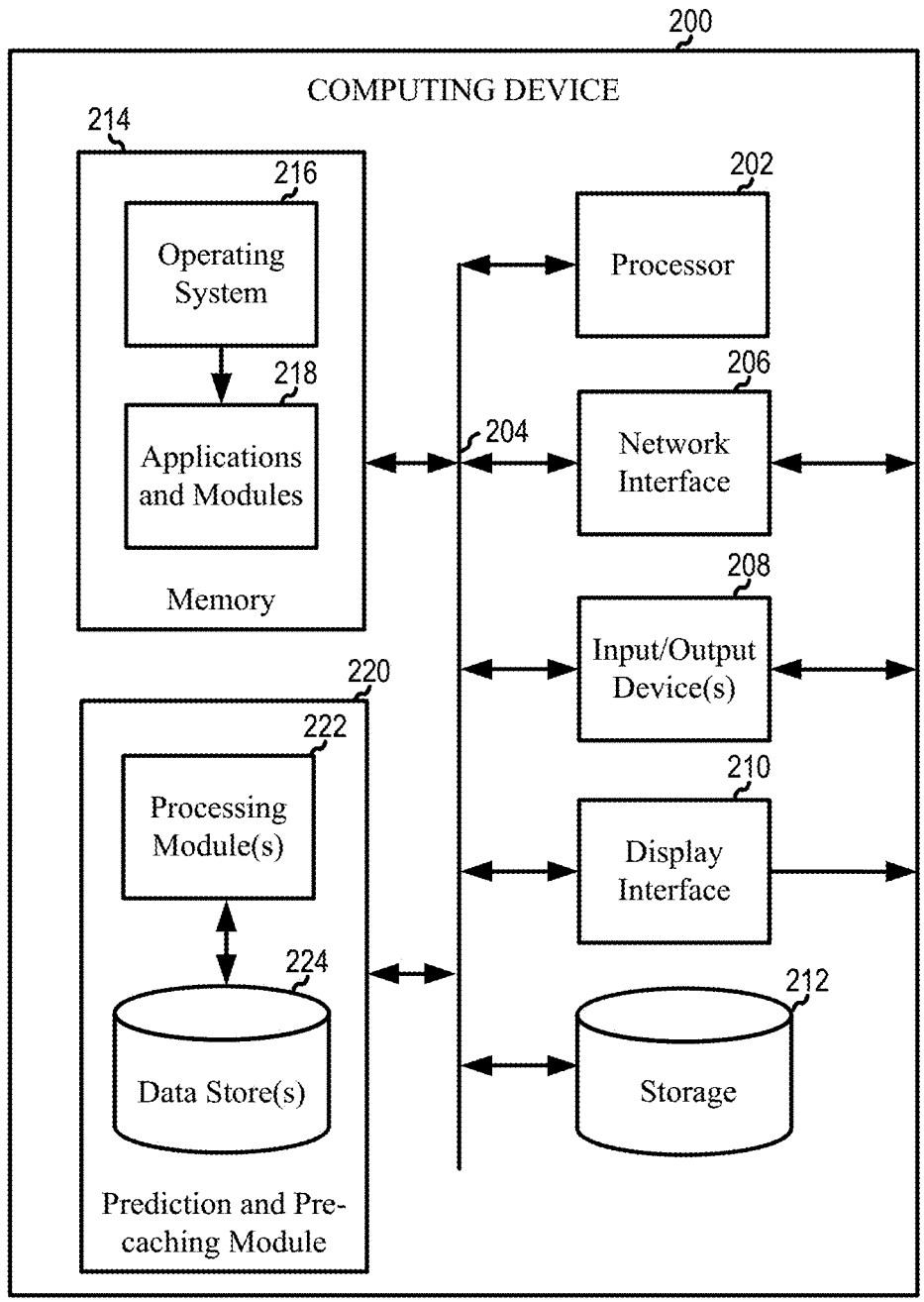
FIG. 2 is a block diagram conceptually illustrating a computing device according to one aspect of the present disclosure.

Aspects of the present disclosure may be implemented as a computer implemented method in a computing device or computer system. FIG. 2 illustrates an exemplary computing device 200. The computing device 200 may include a processor 202 in communication with a variety of other components over a system bus 204 or through a direct connection. The other components may include, for example, a network interface 206, one or more input and/or output devices 208, a display interface 210, and a storage database 212. As appreciated by those skilled in the art, the network interface 206 enables the computing device 200 to communicate data, control signals, data requests, and other information with other resources including computers, data sources, storage devices, and the like, on a network such as the Internet. The network interface 206 may be configured to communicate via wired or wireless connections. As one skilled in the art should appreciate, the computing device 200 may receive an audio, image, video, and other inputs and transmit the input data to another computer, a storage device, or other source via the computer network, as well as save the input data to a networked location.

The input and/or output devices 208 enable the computing device 200 to obtain data input from a variety of devices including, but not limited to, a digital pen, a touch screen, a keyboard, a mouse, a scanner, a microphone, an inertial sensor, a video recorder, a camera and the like. In addition to the exemplary components described above, a display interface 210 may be used for outputting display information to a user. Typically, the display information is output by the display interface 210 via a display device (e.g., a screen or similar device). While not illustrated, one skilled in the art should appreciate that a display device may be incorporated as an integral element within a computing device 200 or may be separate therefrom.

The processor 202 may be configured to operate in accordance with programming instructions stored in a memory 214. The memory 214 generally comprises RAM, ROM, and/or other memory. Thus, in addition to storage in read/write memory (RAM), programming instructions may also be embodied in read-only format, such as those found in ROM or other permanent memory. The memory 214 may store an operating system 216 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 214 may also store user-executable applications and modules 218, or programs, for conducting various functions on the computing device 200. For example, the application 218 in memory 214 may be configured according to aspects of the present disclosure to predict future data access, consumption, and usage and pre-cache the predicted future data prior to the data being needed.

A prediction and pre-caching system may be implemented in an application or module implemented on the computing device 200, in a plurality of cooperating applications/modules on the computing device 200, or in a plurality of cooperating applications and/or modules distributed over multiple computing devices 200 in a computer network, for example. Components of the prediction and pre-caching system may be identified with regard to various logical components. The device 200 may also include a prediction and pre-caching module 220 including processing module(s) 222 and one or more data stores 224. The prediction and pre-caching module 220 may include its own processor and/or memory or may make use of processor 202 and/or memory 214. The one or more data stores 224 may be separate from storage 212 or may overlap with/be included in storage 212. The one or more data stores 224 and the prediction and pre-caching module 220 may also be part of a remote device separate from the computing device 200.

Figure 3:
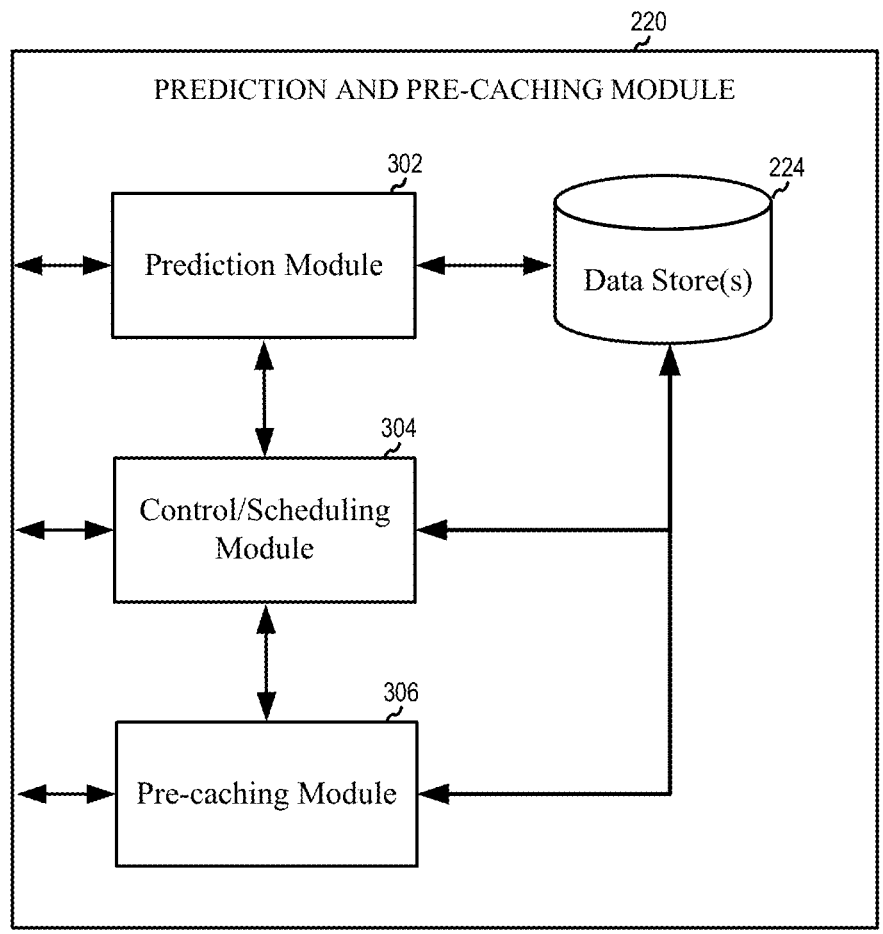
FIG. 3 is a block diagram conceptually illustrating a prediction and pre-caching module according to one aspect of the present disclosure.

FIG. 3 is a block diagram illustrating logical components of a prediction and pre-caching module 220 for predicting future data access, consumption, and usage and pre-caching the predicted future data prior to the data being needed. As illustrated in FIG. 3, the prediction and pre-caching module 220 includes one or more processing module(s) which may include one or more prediction modules 302, one or more control/scheduling modules 304 and one or more pre-caching modules 306. Each module may include its own processor and/or memory or may make use of processor 202 and/or memory 214. Each module 302, 304 and 306 may be connected to the one or more data stores 224. The one or more data stores 224 may include data including wireless data plan rates, usage data of the device and user data, network coverage data, device storage data, device power data, location data, weather data, sporting event data, human phenomena, social phenomena, and other data sources.

In another aspect, other modules and/or storage components may also be included in the prediction and pre-caching module 220. Such modules may include components for considering other information when predicting future data use, scheduling download scheduling options, and performing the pre-caching of the data. Such information may include emails of the user of the device, social networking data relating to the user, and other information relating to the user of the device.

The modules 302, 304 and 306 may perform the prediction and pre-caching, but may also perform user profiling, where at least some of the data used to populate the data stores 224 is collected and/or generated. For example, usage data corresponding to how the user is using the device, including, but not limited to, time, location, and duration of use of certain applications, power level of the device, type of network connectivity available, and other such data may be stored in the data stores 224 for use in predicting the type of data to cache and when to cache such data. In another example, the control/scheduling module 304 may monitor the connectivity of the device to the network and store this data in the data stores 224 for use in coverage mapping.

Using the data and information stored in the data stores 224, the prediction and pre-caching module 220 may analyze the data to predict future data access and consumption, identify download scheduling options associated with the future data, and schedule which pre-caching/download operations to perform and when to perform them using modules 302, 304 and 306. For example, the prediction module 302 may receive or collect input data from the data stores 224, and analyze the input data to predict potential future data needs. The prediction module 302 may use predictive analytics to compile and analyze the data to make predictions about future data access and consumption. In an aspect, the prediction module 302 may include using one or more machine learning algorithms and/or neural networks incorporating localized ontologies about human behavior and cultural profiles as an input, as well as other data as inputs. In this aspect, a user's behavior may fall into one or more weighted cultural profiles which can be used to predict future data access. The user's behavior and cultural profile may also change based on the user's location. For example, the user's behavior may change based on the user's location and surrounding environment. A number of additional approaches known to those skilled in the art may be used to process and analyze the data. In one embodiment, the prediction module 302 compiles and analyzes one or more of human-centric physical phenomena, human societal norms, a user's usage history, a map of data connection quality or coverage map, data plan rates or cost, and availability of network connectivity to predict what data the user will potentially want or need in the future and generate potential download scheduling options.

The download scheduling options may relate to specific data that may potentially be pre-cached. For example, the download scheduling options may correspond to: emails, an RSS feed, geographic maps, travel directions, videos, audio or music, images, news feeds, location, magazines, books, games, social media content, weather, information about a business, points of interest such as, restaurants, tourist attractions, hotels and motels, gas stations, holidays, sporting events, and other such data.

The control/scheduling module 304 may sort and prioritize the download scheduling options for various applications which might make use of pre-cached data (such as a rating application, video playback applications, etc.) in order of importance or potential need, and schedule the time of performance of the download scheduling options. The scheduling may be based on one or more of the following factors: type of network connection, available storage of the device, amount of power remaining in the device, location of the device, predicted time/urgency of access or consumption of the data to be pre-cached, and other factors. The control/scheduling module 304 may also broadcast generic events notifying any listening components, such as other applications, about suggested download scheduling options. For example, an event could be that a connection interruption may be predicted to occur in the near future (e.g. 1 minute, 2, minutes, etc.) causing a scheduled download scheduling option to be short-circuited. In this event, the control/scheduling module 304 may cause the scheduled download scheduling option to be completed before the connection interruption occurs. The pre-caching module 306 may issue instructions to one or more applications on the device to perform pre-caching/download operations, and/or perform the pre-caching/download operations in accordance with the scheduling.

In an aspect, the prediction and pre-caching module 220 may provide data, for example, through low level caching, to multiple applications on the device and may be transparently inserted into the device's networking stack allowing the prediction and pre-caching module 220 to interact with multiple applications. The prediction and pre-caching module 220 also receives input data from, and may initiate communications with other components/applications of a device in order to perform actions, such as performing pre-caching of data associated with those other components/applications. For example, prediction and pre-caching module 220 may receive download scheduling options from applications, such as a news type application, on the device, and/or transmit instructions to the application to initiate caching of data associated with the applications, such as current news headlines and other content.

In one aspect, the control/scheduling module 304 may include an interface to applications on the device. The interface may allow more full-featured integration with applications that may desire to perform pre-caching/download operations. This integration may allow for a query scheduling functionality. For example, an application could query the prediction and pre-caching module 220 to schedule a download scheduling option to be performed if the application or prediction and pre-caching module 220 predicts the user is about to begin watching a video, go to lunch, travel to a certain destination, and other events. The scheduled download scheduling options may also be handled entirely by the prediction and pre-caching module 220 without having to load the application that queried the prediction and pre-caching module 220.

Figure 4:
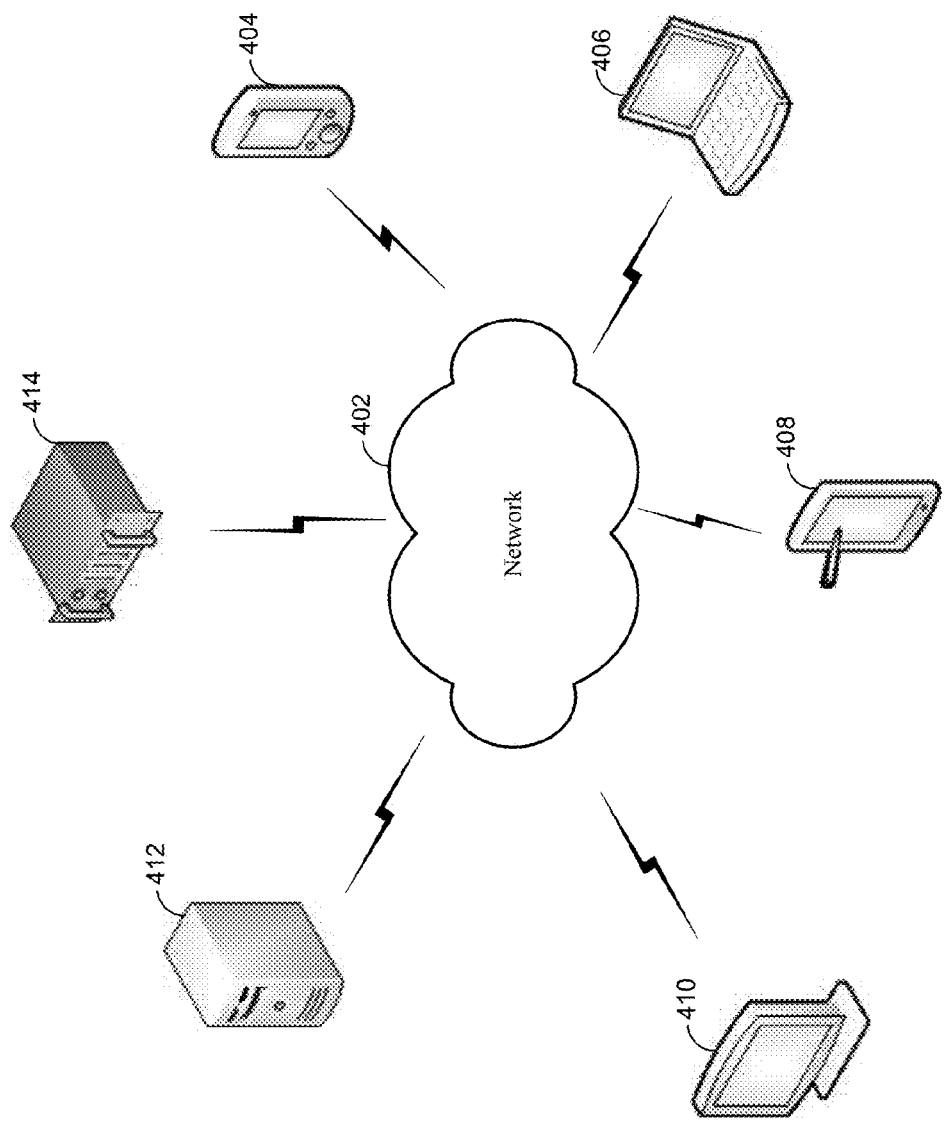
FIG. 4 illustrates a computing network for use with distributed processing according to one aspect of the present disclosure.

As shown in FIG. 4, multiple devices may be connected over a network 402. Network 402 may include a local or private network or may include a wide network such as the internet. Devices may be connected to the network 402 through either wired or wireless connections. For example, a wireless device 404 may be connected to the network 402 through a wireless service provider. Other devices, such as laptop 406 or tablet computer 408 may be capable of connection to the network 402 using various connection methods including through a wireless service provider, over a WiFi connection, or the like. Other devices, such as computer 410, may connect to the network 402 through a wired connection.

In certain system configurations, one or more remote devices may analyze the data in the data stores, generate the download scheduling options, and prioritize the download scheduling options and a local device may perform the download scheduling options. For example, input data may be collected by wireless device 404 and sent over the network 402 to computer 412 or server 414 for storage, processing, and generation and prioritization of the download scheduling options. The prioritized download scheduling options may then be transmitted to the wireless device 404 for scheduling and execution. In another aspect, the data collection and storage, the processing, the generation and prioritization of the download scheduling options, and the scheduling and execution of the download scheduling options may all be performed on different devices. Because such processing may involve significant computational resources, in terms of both storage and processing power, such split configurations may be employed where the device performing the caching has lower processing capabilities than a remote device.

Figure 5:
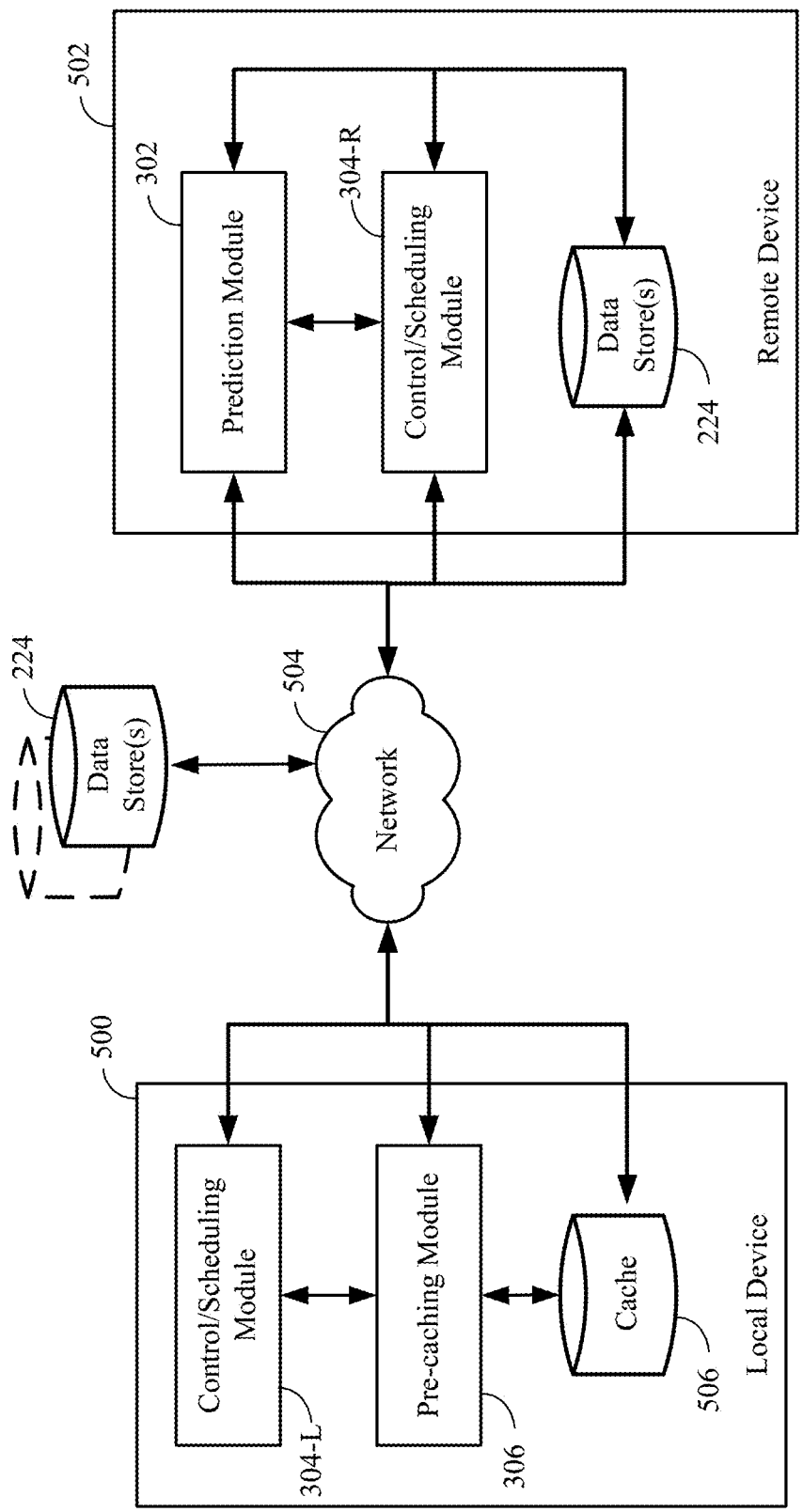
FIG. 5 is a block diagram conceptually illustrating a local device and a remote device for use in a distributed processing environment according to one aspect of the present disclosure.

One configuration of the present disclosure is shown in FIG. 5. In this configuration, a first device or local device 500 may include a control/scheduling module 304-L, a pre-caching module 306, and a cache 506. The control/scheduling module 304-L, the pre-caching module 306, and the cache 506 may be internal to the local device 500 or may be located external to the local device 500. A second device or remote device 502 is in communication with the local device 500 over a network 504. The two devices may be examples of computing device 200, or may be other devices. In this embodiment, the remote device 502 may include one or more data stores 224, a prediction module 302, and a control and scheduling module 304-R. In other configurations, the prediction module 302 may be included on the local device 500.

One or more additional data stores 224 may be located external to and in communication with the local device 500 and the remote device 502 over the network 504. The network 504 may be a wide area network such as the Internet, a local area network, a network allowing physical connection of the devices, a wireless communication network, or other suitable connection between the devices including a direct (wired or wireless) connection.

In one aspect, the prediction module 302 of the remote device 502 may analyze the data in the data stores 224 and generate download scheduling options. The control/scheduling module 304-R of the remote device 502 may prioritize the download scheduling options. The remote device 502 may transmit the prioritized download scheduling options to the local device 500 via the network 504. The pre-caching module 306 of the local device 500 may then perform a pre-caching/download operation. In an aspect, the local device 500 also includes the control/scheduling module 304-L. The control/scheduling module 304-L of the local device 500 may receive un-prioritized download scheduling options from the remote device 502, and perform the prioritization and scheduling of the download scheduling options locally. In another aspect, the control/scheduling module 304-L of the local device 500 may receive the prioritized download scheduling options from the remote device 502 and issue instructions to the pre-caching module 306 to perform pre-caching/download operations. The control/scheduling module 304-L of the local device 500 may also receive pre-caching requests or options from applications of the local device 500, and modify/update the prioritization and scheduling of the download scheduling options taking into account the pre-caching requests or options from the various applications.

In an aspect, the devices, systems, and methods disclosed herein provide for the pre-caching of data prior to the predicted time when such data will be accessed or consumed, without the user of the device having to manually load or pre-load such data. The devices, systems, and methods may form a subsystem that uses knowledge of human-centric physical phenomena, human societal norms, a user's usage history, coverage data, data plan information and cost, and availability of types of network connectivity to pre-cache data expected to be accessed or consumed in the future and/or schedule download scheduling options to be performed at a given place and time.

Figure 6:
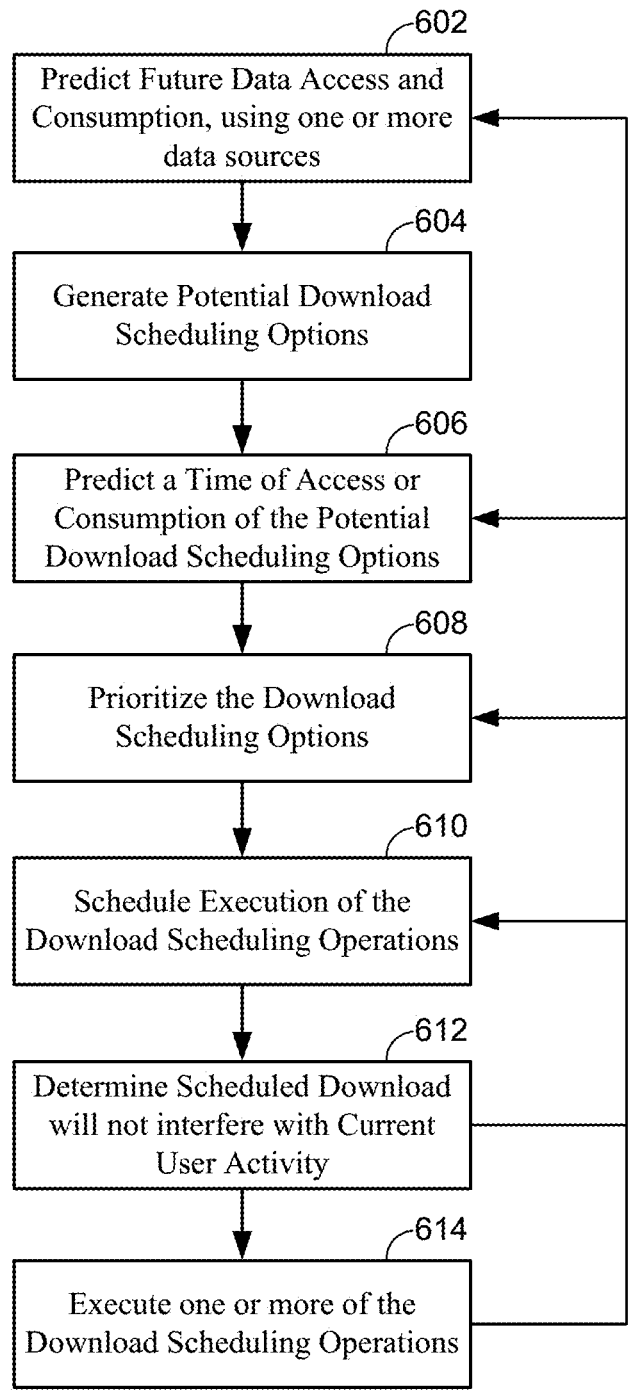
FIG. 6 illustrates a flow diagram of a method and system for predictive caching according to one aspect of the present disclosure.

FIG. 6 is a flow diagram illustrating an exemplary method for predicting future data needs and pre-caching data. One or more of the logical components of FIGS. 2, 3 and/or 5 may perform the method of FIG. 6. In block 602, the potential future data access and consumption is predicted, for example, by analyzing one or more data sources, such as wireless data plan rates, usage data of the device and user data, network coverage data, device storage data, device power data, location data, human phenomena, social phenomena, and other data sources. Potential download scheduling options are then generated, illustrated as block 604. These download scheduling options may relate to geographic map content, directions, video content, audio or music content, image content, news content, location content, magazine content, book content, games, points of interest such as, restaurants, tourist attractions, hotels and motels, gas stations, holidays, sporting events, and other such types of data content.

Some devices, for example wireless devices, may have limited storage and bandwidth. Thus, these devices have a need for prioritizing which download scheduling options to execute or perform in which order and when to perform pre-caching/download operations. In block 606, a predicted time of access or consumption of the future data/download scheduling options is predicted. The download scheduling options are weighted, for example, in terms of potential future need, relevance to the user, and predicted actual access or consumption and prioritized, illustrated as block 608. The pre-caching/download operations are scheduled, illustrated as block 610. Prior to the execution of the pre-caching/download operations, a determination may be made as to whether the execution will interfere with the current user's activity or use of the device, illustrated as block 612. When the user's current use of the device will not be interfered with, the pre-caching/download operation is then executed in accordance with the schedule, illustrated as block 614.

When execution of a scheduled pre-caching/download operation will interfere with the user's use of the device, the schedule may be updated to execute the pre-caching/download operation at a time when it will not interfere with the user's use of the device. Further, if the execution of a scheduled pre-caching/download operation cannot be executed at a later time, for example, because of the estimated time that the user will access or consume the data, the execution of a scheduled pre-caching/download operation may be cancelled.

This prioritization and scheduling allows the download scheduling options to be organized and executed such that relevant data or data that the user will actually be accessing and consuming in the future is pre-cached, and not irrelevant data that merely takes up storage on the device. This also allows the schedule to be updated or modified such that the user's use of the device is not interfered with by executing the downloading options at an inappropriate time. For example, if the user is watching a video during the time a certain pre-caching/download operation is scheduled to execute, and execution of the pre-caching/download operation may interfere with or cause interruption of the video, for example, due to limited network bandwidth, then the schedule may be updated or the execution cancelled so as to allow the user to watch the video without interference or interruption.

In an aspect, the download scheduling options that were actually executed are identified and fed back into one or more of the predicting processes, the prioritizing process, and the scheduling process to train these processes and improve their performance. For instance, if a certain download scheduling option is being executed, but the data associated with that download scheduling option is not being accessed or consumed by a user as predicted, then that download scheduling option may be removed from the schedule in the future, given a low priority, and/or not even identified as a download scheduling option in the future.

Figure 7:
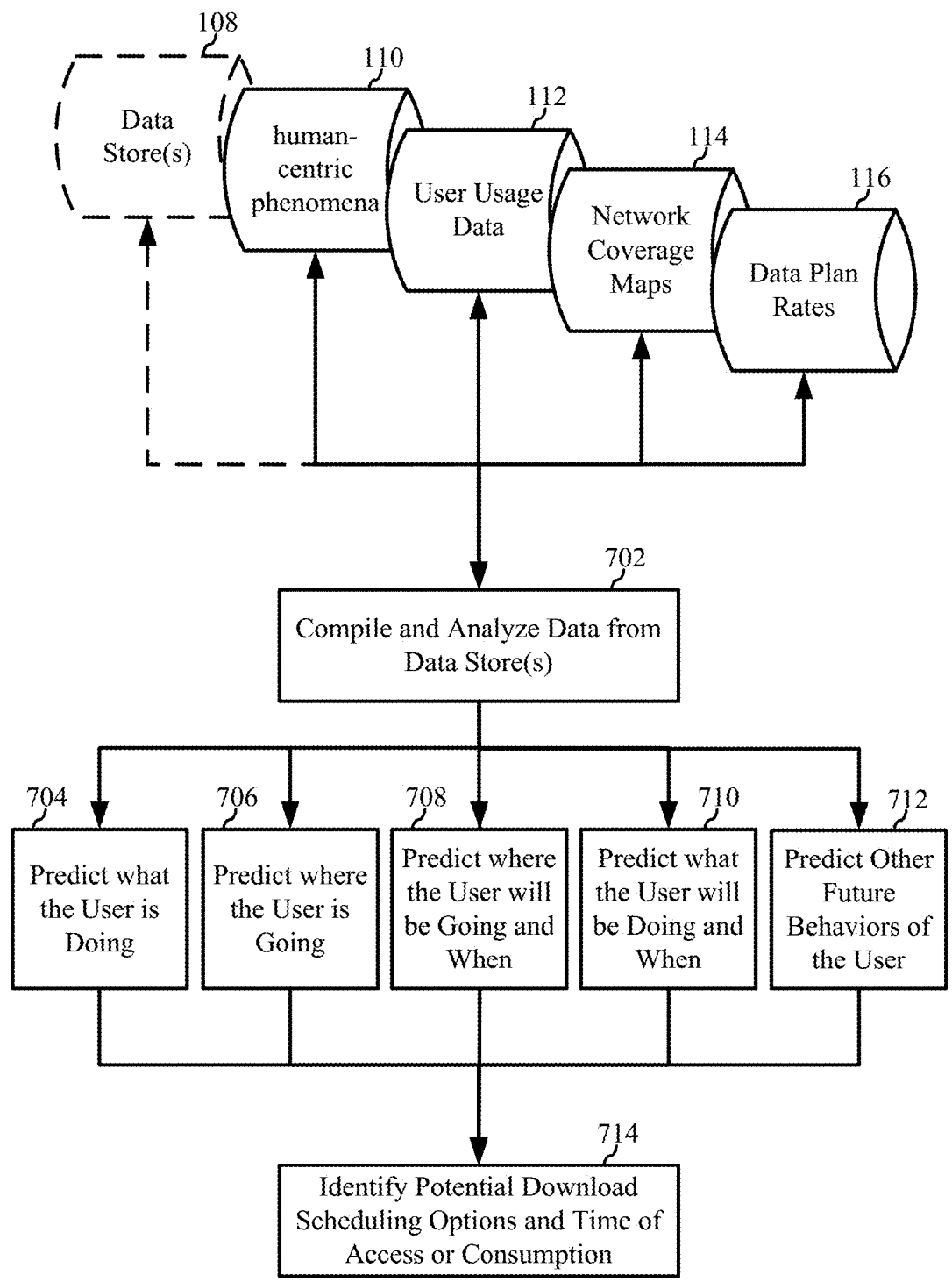
FIG. 7 illustrates a flow diagram of a method and system for predicting future data needs according to one aspect of the present disclosure.

FIG. 7 is a flow diagram illustrating an exemplary method for predicting future data needs. One or more of the logical components of FIGS. 2, 3 and/or 5 may perform the method of FIG. 7. In block 702, information from one or more data stores, for example data stores 108-116 described above is compiled and analyzed. Based on this data, for example, human-centric physical phenomena, human societal norms, the user's usage history, coverage map data, data plan information and cost, and availability of types of network connectivity, the user's behavior is predicted. For example, what the user is doing, illustrated as block 704, where the user is going, illustrated as block 706, where the user will be going and when, illustrated as block 708, what the user will be doing and when, illustrated as block 710, and other future behaviors of the user, illustrated as block 712, or other behaviors may be predicted. Using one or more of these predictions, one or more potential download scheduling options may be identified along with a predicted time of access or consumption of the data.

In one example, the user's usage history may indicate that the user may be watching a certain downloaded television program while the user is on a train on his/her way to work at 6:00 AM. The data in the data store's may also indicate that the user travels home from work on a 8:00 PM train, and watches another episode of the same television program. In this manner, it can be predicted that the user will watch the next episode of the television program at 6:00 AM in the future and another episode at 8:00 PM in the near future. This allows the device to pre-cache the predicted episodes the user may watch in the near future, allowing the user to watch the episodes without interruption even if the network connection of the device is interrupted during the normal viewing time.

In another example, the user and device may be traveling at an accelerated speed (e.g., 50 mph) on a highway, along a certain route. This may indicate that the user is traveling in a car and going to a specific destination based on past user behavior. In this respect, the device may pre-cache maps, travel routes, points of interest along the predicted route, and/or other such data so that this data is available to the user if the network connectivity of the device is interrupted. Different data may be pre-cached if the user is moving at 15 mph, 1 mph, etc.

Figure 8:
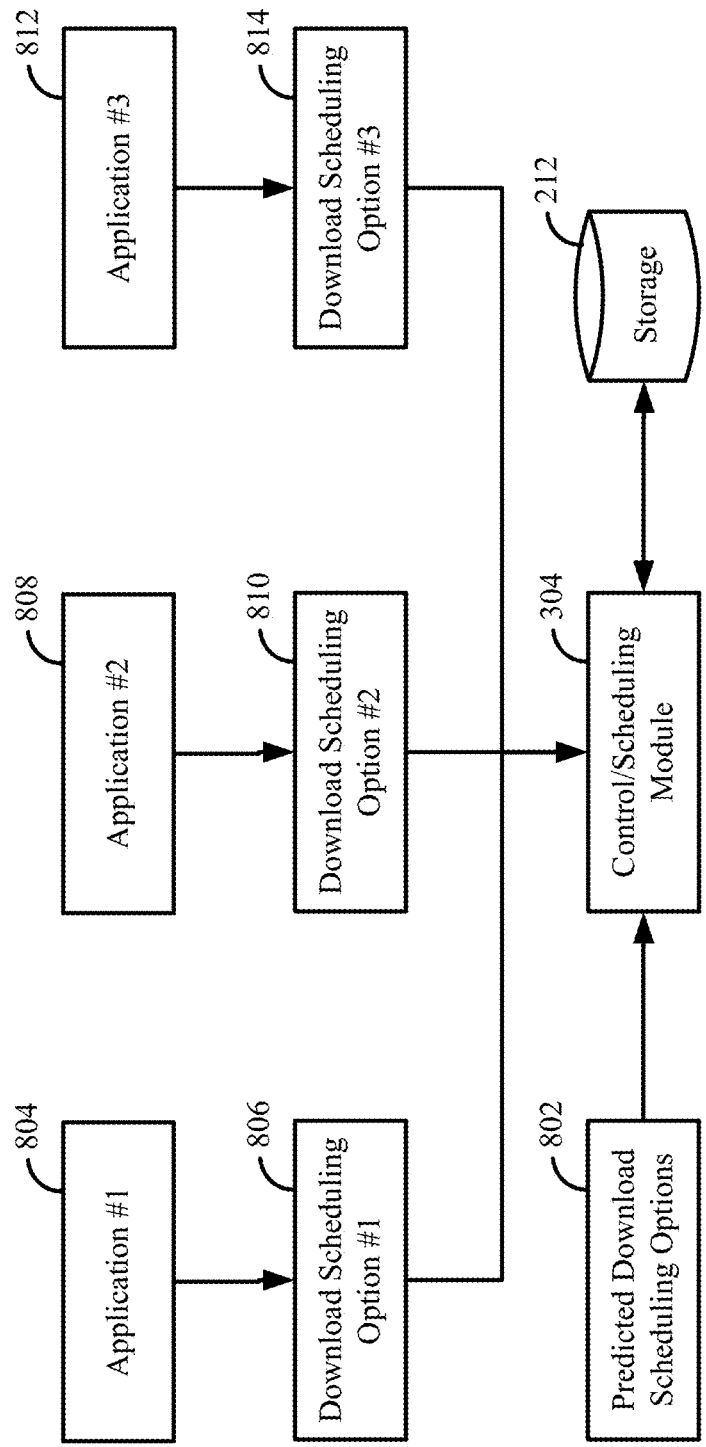
FIG. 8 illustrates a functional block flow diagram of a method and system for receiving queries for pre-caching data according to one aspect of the present disclosure.

The other data store(s) may include calendaring information of the user, proximity of the user's device to other devices and users, weather, behavior changes based on the weather, sports schedules, holidays, emails and text messages, social media, and other data of the type. This information may also be used to predict who is around the user or in the user's environment (e.g. work colleagues, friends, children, etc.), and pre-caching of data can be directed to behaviors of the user or human behavior in general in certain environments In an aspect, in addition to the download scheduling options identified and generated through prediction, applications of the device may submit queries for download scheduling options that can be executed. FIG. 8 is a functional block flow diagram illustrating an exemplary method for receiving queries for pre-caching data. One or more of the logical components of FIGS. 2, 3 and/or 5 may perform the method of FIG. 8. As described above, the control/scheduling module 304 may receive one or more predicted download scheduling options 802. In addition, one or more applications may submit download scheduling option queries to the control/scheduling module 304. For example, an application #1 804 may submit a potential download scheduling option #1 806, an application #2 808 may submit a potential download scheduling option #2 810, and an application #3 812 may submit a potential download scheduling option #3 814. This allows the control/scheduling module 304 to receive and schedule requested download scheduling options that can be performed.

In an aspect, the download scheduling option #1 806, download scheduling option #2 810, and download scheduling option #3 814 may include descriptive language to allow the download scheduling options 806, 810, and 814 to be categorized, for example into categories, such as entertainment, travel, news, etc. This categorization may allow the control/scheduling module 304 determine which, if any, to potentially execute. For example, if it is determined that there is an opportunity to pre-cache entertainment the control/scheduling module 304 may look to see if there are any queries that relate to entertainment and potentially schedule one or more of the download scheduling options 806, 810, and 814 to be executed. In this respect, download scheduling options from various applications can be allocated to or performed in an efficient manner, based on bandwidth and available storage of the device.

Figure 9:
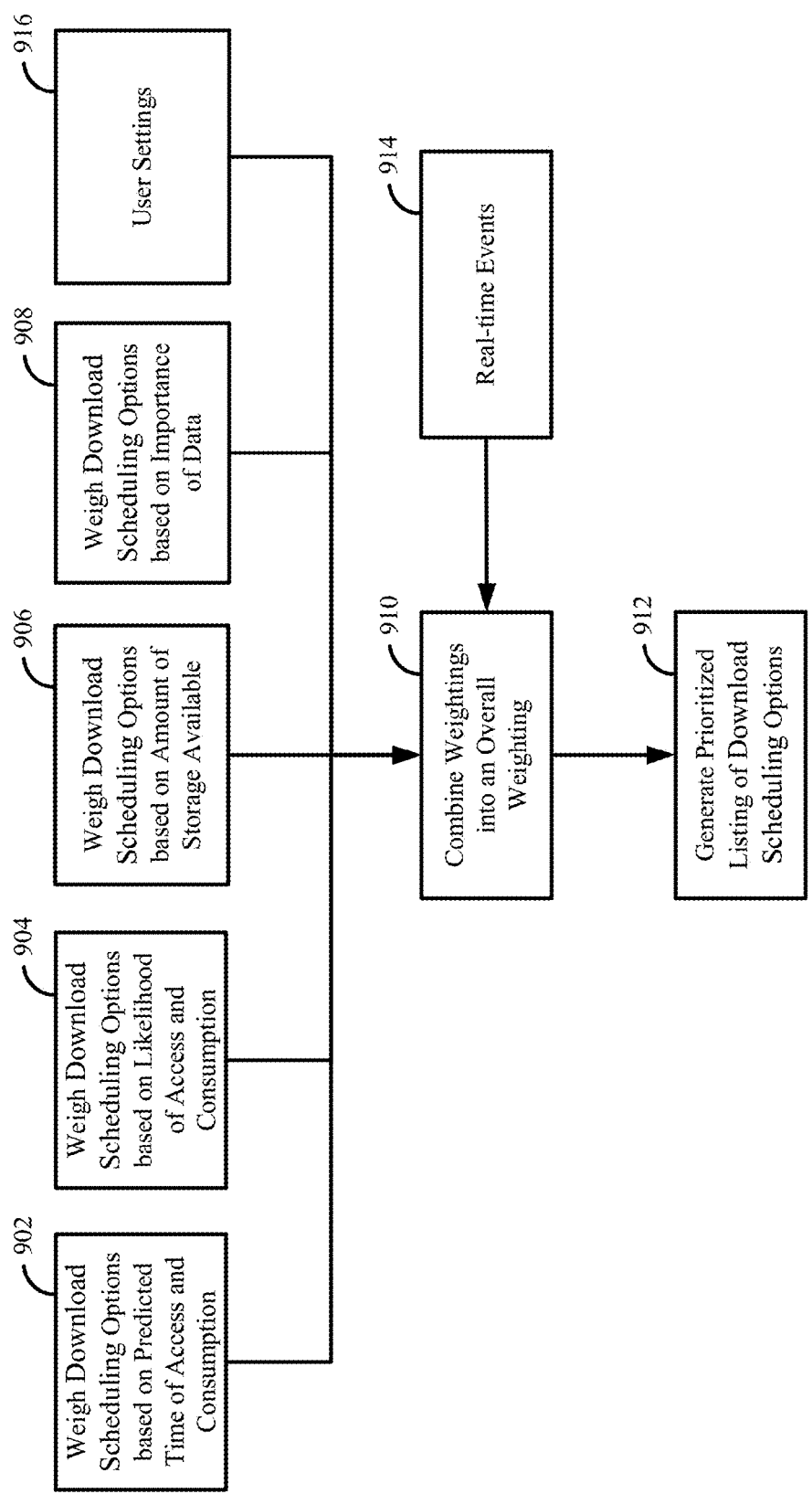
FIG. 9 illustrates a flow diagram of a method and system for prioritizing download scheduling options according to one aspect of the present disclosure.

In an aspect, the download scheduling options are prioritized to cause pre-cashing options with a higher priority to be performed prior to those with lower priority. FIG. 9 is a flow diagram illustrating an exemplary method for prioritizing download scheduling options. One or more of the logical components of FIGS. 2, 3 and/or 5 may perform the method of FIG. 9. In block 902, the download scheduling options may be weighted based on a predicted time of access and consumption of the data corresponding to the download scheduling options. The download scheduling options may be weighted based on likelihood of access and consumption of the data corresponding to the download scheduling options, illustrated as block 904. The download scheduling options may be weighted based on an amount of storage available in relation to the amounts of data corresponding to the download scheduling options, illustrated as block 906. The download scheduling options may be weighted based on importance of the data corresponding to the download scheduling options, illustrated as block 908. These weightings may then be combined to provide and overall weighting, illustrated as block 910, and a prioritized list of the download scheduling options may be generated, illustrated as block 912. All of these processed may be performed and updated in real-time based on the user's behavior. The weightings may be suggested by individual applications and/or determined the prediction and pre-caching module 220 or other component.

In an example, if the user frequently launches a certain application at a certain time, for example 6:15 PM, and it is 6:00 PM, one or more download scheduling options relating to the application may receive a high priority. In another example, if data relating to a certain download scheduling option is infrequently accessed and consumed, the download scheduling option may receive a lower priority because it is not actually being accessed and consumed by the user. In another example, if data relating to a certain download scheduling option is large and cannot be stored in the device storage, the download scheduling option may receive a lower priority, because it may not be able to be completed at the current time. In yet another example, if data relating to a certain download scheduling option is less important than others, the download scheduling option may receive a lower priority, because other download scheduling options are more important.

In an aspect, real-time events may be fed into the prioritization to modify the priority of download scheduling options in real time, illustrated s block 914. For example, if the user leaves work early and normally watches an episode of a television show on the user's way home, the priority of the download scheduling option relating to the episode may be increased to allow the episode to be pre-cached before the user begins watching the episode.

In another aspect, user setting may be received and fed into the prioritization, illustrated as block 916. This may allow the user to provide input to change the prioritization. For example, next weekend the user may be taking a trip and want travel information and/or entertainment information. In this regard the user can inform the device of the user's desire to pre-cache such information prior to the trip.

Figure 10:
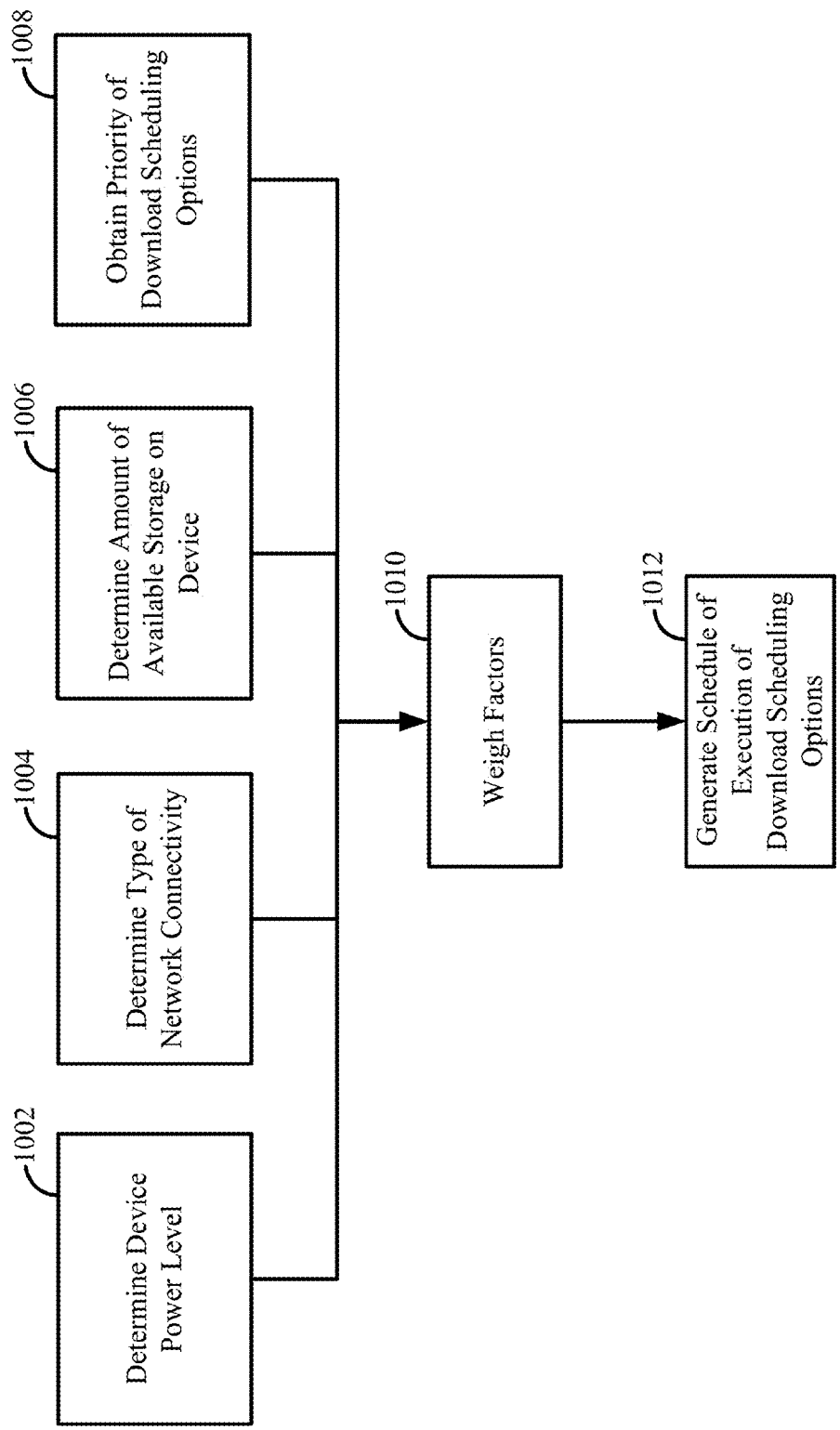
FIG. 10 illustrates a flow diagram of a method and system for scheduling download scheduling options according to one aspect of the present disclosure.

In one aspect, scheduling allows the device to organize the pre-caching so as to avoid multiple applications preforming pre-caching at the same time and/or from multiple download scheduling options being performed at the same time. If multiple pre-caching is performed at the same time, the device operation may be affected due to a large number of operations being performed. FIG. 10 is a flow diagram illustrating an exemplary method for scheduling download scheduling options. One or more of the logical components of FIGS. 2, 3 and/or 5 may perform the method of FIG. 10. In block 1002, a power level of the device is determined. In block 1004, a type of network connectivity, for example, WiFi, 3G, 4G, etc. of the device is determined. In block 1006, an amount of available storage space of the device is determined. In block 1008, the priority of the download scheduling options is obtained or received. These various factors may be weighted together, illustrated as block 1010, and a schedule of when to execute certain download scheduling options may be generated, illustrated as block 1012. In an aspect, user settings may also be available for scheduling of the download scheduling options, thus allowing the user to modify the schedule as desired.

Figure 11:
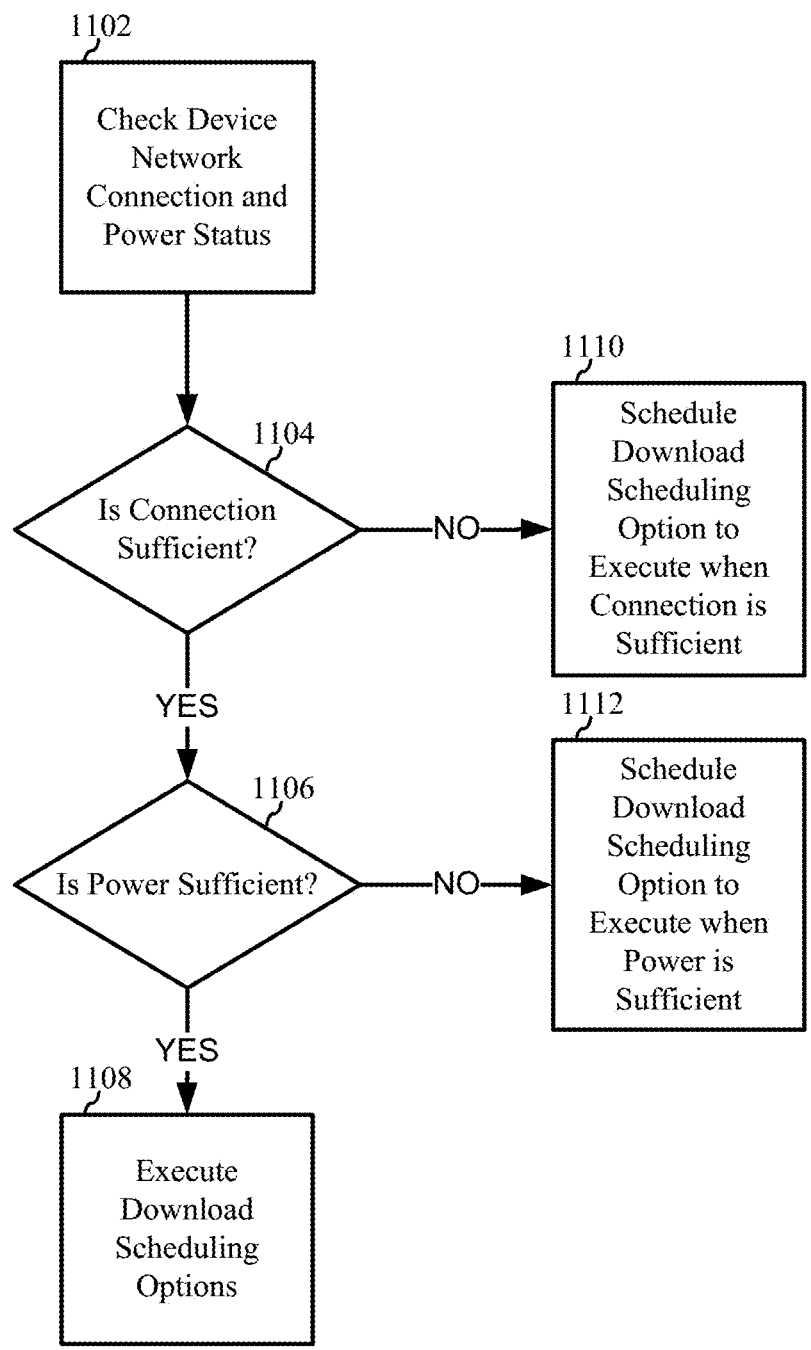
FIG. 11 illustrates a flow diagram of a method and system for scheduling download scheduling options based on power consumption and network connectivity according to one aspect of the present disclosure.

An example of scheduling download scheduling options based on device power and network connectivity is described with reference to FIG. 11. As illustrated, a check is made to determine the status of the power level of the device and the network connection of the device, illustrated as block 1102. For example, this may include determining whether the device is plugged in, and or the type of network connection, for example, WiFi, 3G, 4G, etc.

A decision may be made as to whether the network connection is sufficient to cache data corresponding to one or more of the download scheduling options, illustrated as block 1104. Another decision may also be made as to whether the device power is sufficient to cache data corresponding to one or more of the download scheduling options, illustrated as block 1106. When the network connection and the device power are sufficient, the download scheduling options may be executed or scheduled to execute, illustrated as block 1108. For example, when the device is plugged in and the network connection is, for example, WiFi (i.e., data is free), download scheduling options may be scheduled and executed. In this situation, the device has all the power it needs and data is free, so the device will pre-cache large amounts of data.

When the network connections is not sufficient or unavailable, the download scheduling options may be scheduled to execute when the network connection is sufficient and available, illustrated as block 1110. For example, when the device is plugged in and the network connection is, for example, 4G (i.e., data that costs money), a check may be made to see if WiFi is predicted to be available prior to the need for the data associated with the download scheduling option. If WiFi is predicted to be available prior to the need for the data associated with the download scheduling option, the download scheduling options may be scheduled to execute when the WiFi is available to avoid data fees associated with 4G. On the other hand, if WiFi is not predicted to be available prior to the need for the data associated with the download scheduling option, the download scheduling options may be scheduled and executed prior to the need for the data. In this situation, the pre-caching may be more conservative since pre-caching the data may cost the user a fee.

When the device power is not sufficient, the download scheduling options may be scheduled to execute when the device power is sufficient, illustrated as block 1112. For example, when the device is not plugged in (i.e., battery power will be consumed) and the network connection is, for example, 4G (i.e., data that costs money), the a check may be made to see if WiFi is predicted to be available prior to the need for the data associated with the download scheduling option, and if WiFi is, the download scheduling options may be scheduled to execute when the WiFi is available. On the other hand, if WiFi is not predicted to be available prior to the need for the data, the download scheduling options may simply be scheduled to execute prior to the need for the data. Additionally, a check may be made to see if power is predicted to be available prior to the need for the data associated with the download scheduling option, and if power is available, the download scheduling options may be scheduled to execute when the power is available. Thus, in the situation where WiFi and power are predicted to be available, the pre-caching can be executed when the power and the WiFi are both available. On the other hand, if power is not predicted to be available prior to the need for the data, the download scheduling options may be scheduled to execute prior to the need for the data. In this situation, the pre-caching may be more conservative since battery power will be consumed. Additionally, when battery is being used and the connection is 4G the pre-caching may become even more conservative since battery power is being consumed and pre-caching the data may cost the user a fee.

In another situation, when the device is not plugged in and the network connection is, for example, WiFi, the check may be made to see if power is predicted to be available prior to the need for the data associated with the download scheduling option, and if power is, the download scheduling options may be scheduled to execute when the power is available. On the other hand, if power is not predicted to be available prior to the need for the data, the download scheduling options may be scheduled to execute prior to the need for the data.

Thus, for example, if a device is connected to WiFi and plugged in, download scheduling options may be executed since battery is not being consumed and data is free. However, when the device is un-plugged and travels out of WiFi connection into 4G connection, the pre-caching may become more conservative, thereby conserving battery power and limiting potential data fees associated with 4G. Checks on other conditions in addition to/instead of the connection and power checks illustrated in FIG. 11 may also be performed.

Figure 12:
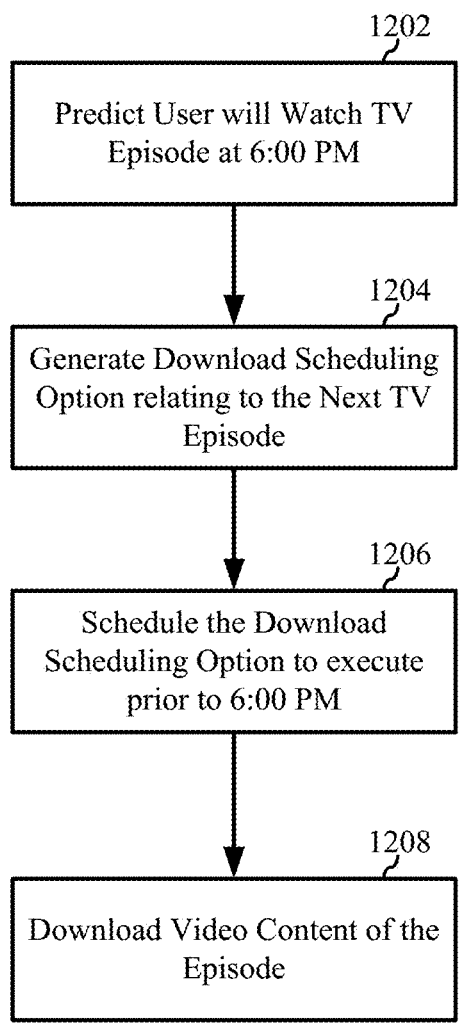
FIG. 12 illustrates a flow diagram of a method and system for predictive pre-caching of video content according to one aspect of the present disclosure.

In one aspect, an example of predicting and pre-caching data related to video content is described with reference to FIG. 12. A user may typically watch an episode of a television series on the train on the user's way home from work at 6:00 PM. Based on the data in the data store(s) described above, a prediction may be made that the user will watch the next episode in the series at 6:00 PM, illustrated as block 1202. For example, the prediction may be based on the user's previous consumption of video content, for example, a specific title of the content, the time or location of the viewing, the last known viewing content, the ability to obtain future video content, battery usage, available storage and other factors.

A download scheduling option relating to the next episode is then generated, illustrated as block 1204, and scheduled for execution prior to 6:00 PM, illustrated as block 1206. In this aspect, the next episode may be scheduled to execute, when the device is plugged in and connected to WiFi or at some other time prior to 6:00 PM when the episode needs to be available. This allows a user to have the video content of the episode downloaded to the user's device prior to the user accessing and consuming the video content, illustrated as block 1208. The provides the user with a smooth uninterrupted capability of watching the episode, even if the network connectivity of the device is interrupted, for example, by building and tunnels along the train route.

Figure 13:
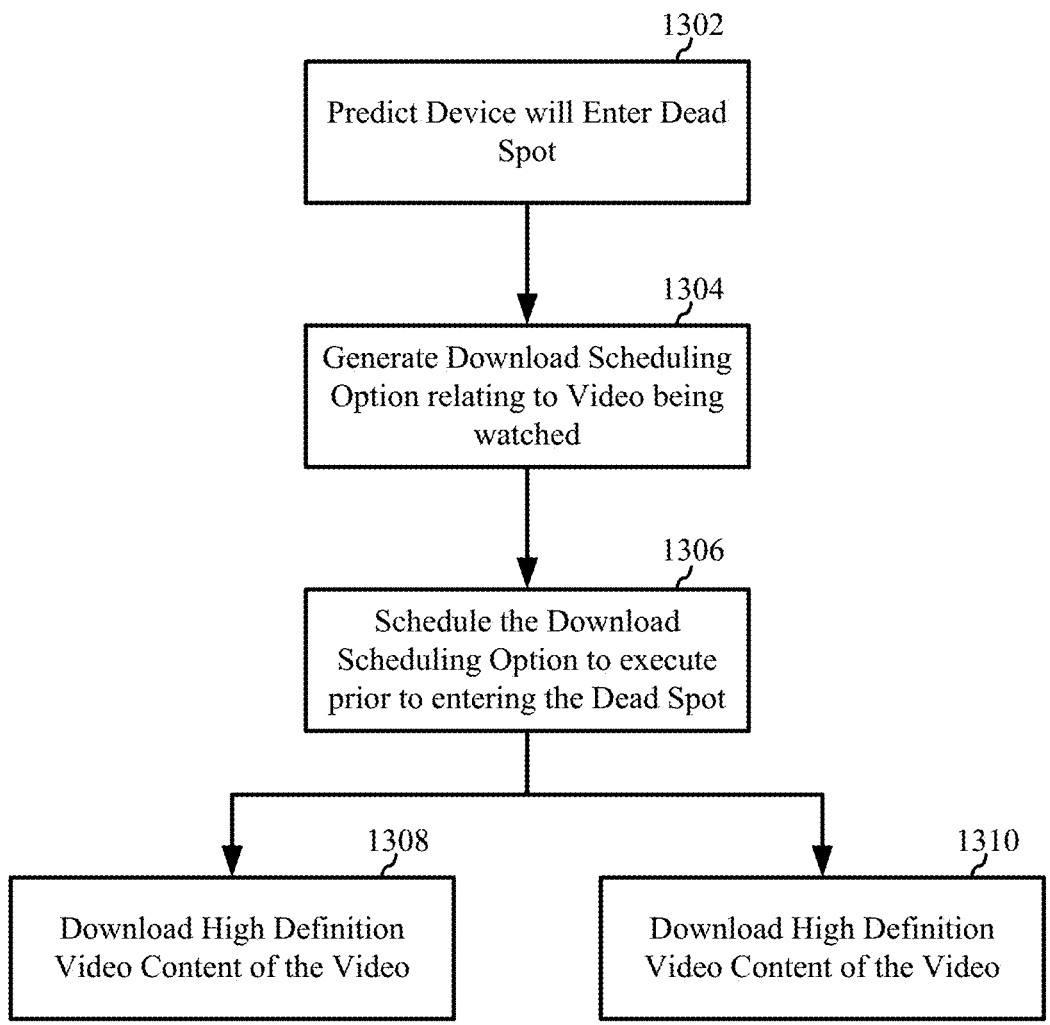
FIG. 13 illustrates a flow diagram of another method and system for predictive pre-caching of video content according to one aspect of the present disclosure.

In another aspect, another example of predicting and pre-caching data related to video content is described with reference to FIG. 13. A user may be traveling as a passenger in an automobile and watching a video on the user's device. Based on the data in the data store(s) described above, a prediction may be made that the device will lose network connection or enter a dead spot if the user continued to travel along the current route, illustrated as block 1302. For example, the prediction may be based on time and location of the user, speed the user is traveling, network coverage maps and other factors.

A download scheduling option relating to the video is then generated, illustrated as block 1304, and scheduled for execution prior to the device entering the dead spot, illustrated as block 1306. In this aspect, the downloaded content may be the entire video, a remainder of the video, or a portion of the video required to cover the dead spot. In an aspect, based on connection speed and predicted time to the dead spot, high quality video, for example, high-definition video, may be downloaded illustrated as block 1308. However, if the time remaining to the dead spot is not sufficient to pre-cache high quality video, a lower bandwidth stream may be used because it can be downloaded faster that the high quality video, illustrated as block 1310. This allows the user to continuously watch the video through the dead spot without interruption.

Figure 14:
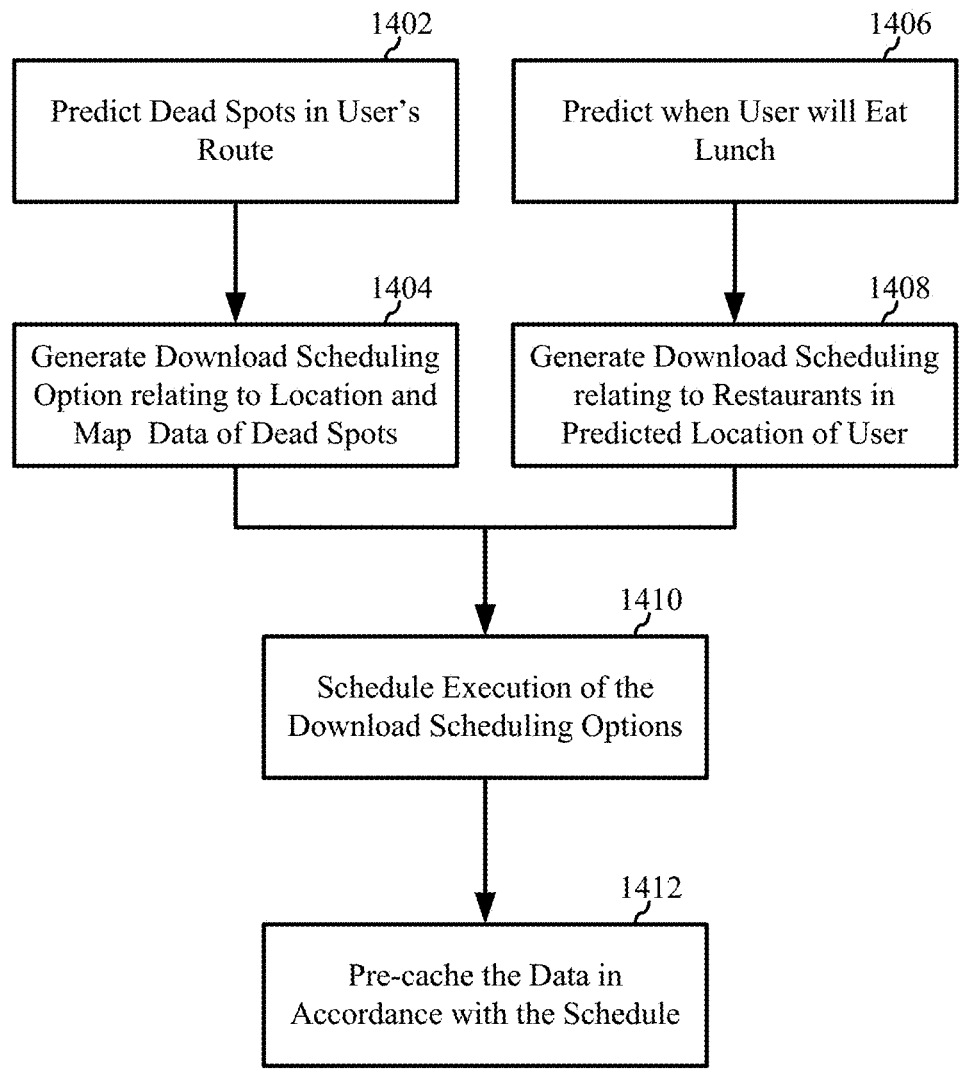
FIG. 14 illustrates a flow diagram of a method and system for predictive pre-caching of travel content according to one aspect of the present disclosure.

In another aspect, an example of predicting and pre-caching data related to travel content is described with reference to FIG. 14. A user may be traveling to a destination, for example on a trip to Florida from Massachusetts. In general, map data can be large and the user may not want to fill the storage of the user's device with all of the map data for the route. So the user may desire to obtain the map data as the user travels along the route. However, there can be dead spots along the route where the user's device may lose connection to a network. In this aspect, the location and timing of the user entering the dead spots can be predicted, illustrated as block 1402, and download scheduling options can be generated relating to the location and map data corresponding to the dead spots, illustrated as 1404. In another aspect, based on information, for example, human centric phenomena to profile the user's behavior, and other information, it may be predicted that the user will eat lunch at a certain time, illustrated as block 1406. Download scheduling options can be generated relating to the restaurant and points of interests corresponding to the location the user will be at the time the user typically eats lunch, illustrated as 1408.

These download scheduling options can be scheduled to be executed while the user's device has connectivity, illustrated as 1410, and the download scheduling options can be executed in accordance with the schedule, illustrated as block 412. This provides the user with pre-cached data relating to the travel route, restaurants, and points of interest in the locations that the user is predicted to be in at the time the user will likely stop to eat and when the user is likely to be in a dead spot. Thus, this allows the user to experience an uninterrupted data stream even when the user is located in a dead spot.

The devices, systems, and method disclosed herein may also be used to pre-cache a number of different data based on the predictions and information in the data store(s) described herein. For example, download scheduling options may include restaurant data and points of interest, map data and other travel data, hotel and accommodation information, video content, audio content, and any number of other types of data available over the networks described herein.

In an aspect, the device may be configured to detect other devices that are near the current user. In this aspect, the device may be able to identify common areas of interest between the users of the devices and generate potential download scheduling options that may be performed for videos, music, games, events, and other entertainment that are common or would be of interest to the various users of the devices.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method for transferring content to a wireless device, comprising:
   determining a mode of transportation based at least in part on data corresponding to past device operation and a movement of the wireless device as the wireless device is traveling;
   determining a predicted destination based at least in part on the data corresponding to the past device operation and the movement of the wireless device;
   identifying a first content item for downloading to the wireless device based at least in part on the mode of transportation and the predicted destination;
   determining a first time when the first content item will be accessed by a user of the wireless device;
   determining a second time, prior to the first time, when a cellular wireless network is accessible;
   determining a third time, prior to the first time, when a non-cellular wireless network is accessible;
   determining a schedule for downloading the first content item to the wireless device at about the third time based at least in part on:
      accessibility of the non-cellular wireless network being weighted higher than accessibility of the cellular wireless network, and
      the movement of the wireless device; and
   downloading the first content item in accordance with the schedule to provide access to the first content item to the user, such that the downloading does not interfere with a current user activity of the wireless device.

2. The method of claim 1, wherein the determining of the schedule is further based at least in part on a predicted battery power level of the wireless device at the first time.

3. The method of claim 1, wherein the determining of the schedule is further based at least in part on one or more of a location of the wireless device, an amount of available storage of the wireless device, or a power level of the wireless device.

4. The method of claim 1, further comprising:
   identifying a second content item for downloading to the wireless device;
   determining a first priority of the first content item and a second priority of the second content item; and
   wherein the determining of the schedule is further based at least in part on one or more of the first priority or the second priority.

5. A non-transitory computer-readable storage medium storing processor-executable instructions for controlling a computing device, comprising:
   program code to determine a mode of transportation based at least in part on data corresponding to past device operation and a movement of a wireless device as the wireless device is traveling;
   program code to determine a predicted destination based at least in part on the data corresponding to the past device operation and the movement of the wireless device;
   program code to identify first data to be downloaded to the wireless device based at least in part on the mode of transportation and the predicted destination;
   program code to determine a first time when the first data will be accessed by a user of the wireless device;
   program code to determine a second time, prior to the first time, when a cellular wireless network is accessible;
   program code to determine a third time, prior to the first time, when a non-cellular wireless network is accessible;
   program code to determine a first schedule for downloading the first data at the third time based at least in part on:
      accessibility of the non-cellular wireless network being weighted higher than accessibility of the cellular wireless network, and
      the movement of the wireless device; and
   program code to download the first data in accordance with the first schedule.

6. The non-transitory computer-readable storage medium of claim 5, further comprising:
   program code to identify second data to be downloaded to the wireless device; and
   program code to identify third data to be downloaded to the wireless device.

7. The non-transitory computer-readable storage medium of claim 6, further comprising program code to assign a priority to the second data and the third data.

8. The non-transitory computer-readable storage medium of claim 7, wherein the priority is based at least in part on one or more of network coverage maps, available network bandwidth, a location of the device, a determined time of access to the second or third data, an amount of available storage on the wireless device, a power level of the wireless device, or a type of network connection available to the wireless device.

9. The non-transitory computer-readable storage medium of claim 8, further comprising:
   program code to generate a second schedule for downloading the second and third data, wherein the second schedule includes downloading the second and third data based on the priority; and
   program code to download the second and third data in accordance with the second schedule.

10. The non-transitory computer-readable storage medium of claim 5, wherein the program code to determine the first schedule for downloading the first data is further based on the wireless device being connected to an external power source.

11. The non-transitory computer-readable storage medium of claim 5, further comprising:
    program code to determine that the wireless device will have no access to the cellular wireless network or the non-cellular wireless network at the first time.

12. The non-transitory computer-readable storage medium of claim 5, wherein the first data is one or more of an email, an RSS feed, a geographic map, travel directions, a video, audio, an image, news, a location, a magazine, a book, a game, information about a business, social media content, or weather.

13. A computing device, comprising:
    at least one processor; and
    a memory device including instructions operable to be executed by the at least one processor to perform a set of actions, configuring the at least one processor:

to determine a mode of transportation based at least in part on data corresponding to past device operation and a movement of the computing device as the computing device is traveling;

to determine a predicted destination based at least in part on the data corresponding to the past device operation and the movement of the computing device;

to identify first data to be downloaded to the computing device based at least in part on the mode of transportation and the predicted destination;

to determine a first time when the first data will be accessed by a user of the computing device;

to determine a second time, prior to the first time, when a cellular wireless network is accessible;

to determine a third time, prior to the first time, when a non-cellular wireless network is accessible;

to determine a first schedule for downloading the first data at the third time based at least in part on:
  accessibility of the non-cellular wireless network being weighted higher than accessibility of the cellular wireless network, and
  the movement of the computing device speed the computing device; and to download the first data at the third time in accordance with the first schedule.

14. The computing device of claim 13, wherein the at least one processor is further configured:
  to identify second data to be downloaded to the computing device; and
  to identify third data to be downloaded to the computing device.

15. The computing device of claim 14, wherein the at least one processor is further configured to assign a priority to the second data and the third data.

16. The computing device of claim 15, wherein the at least one processor is further configured to assign the priority based at least in part on one or more of network coverage maps, available network bandwidth, a location of the computing device, a determined time of access to the second or third data, an amount of available storage on the computing device, a power level of the computing device, or a type of network connection available to the computing device.

17. The computing device of claim 16, wherein the at least one processor is further configured:
  to generate a second schedule for downloading the second and third data, wherein the second schedule includes downloading the second and third data based on the priority; and
  to download the second and third data in accordance with the second schedule.

18. The computing device of claim 13, wherein the determining of the first schedule for downloading the first data is further based on the computing device being connected to an external power source.

19. The computing device of claim 13, wherein the at least one processor is further configured:
  to determine that the computing device will have no access to the cellular wireless network or the non-cellular wireless network at the first time.

20. The computing device of claim 13, wherein the first data is one or more of an email, an RSS feed, a geographic map, travel directions, a video, audio, an image, news, a location, a magazine, a book, a game, information about a business, social media content, or weather.

* * * * *